United States Patent [19]

Sollars, Jr.

[11] Patent Number: 5,482,318

[45] Date of Patent: Jan. 9, 1996

[54] PLEATED INFLATABLE CUSHION FOR PASSENGER RESTRAINT

[75] Inventor: John A. Sollars, Jr., LaGrange, Ga.

[73] Assignee: Milliken Research Corporation, Spartanburg, S.C.

[21] Appl. No.: 144,673

[22] Filed: Oct. 27, 1993

[51] Int. Cl.⁶ .................................................. B60R 21/16
[52] U.S. Cl. ........................................ 280/743.1; 383/120
[58] Field of Search ............................ 280/743 R, 728 R, 280/730 R, 731, 732, 743 A, 743.1, 728.1, 730.1, 743.2; 383/120, 107, 3; 112/427

[56] References Cited

U.S. PATENT DOCUMENTS

| | | | |
|---|---|---|---|
| 528,421 | 10/1894 | Estlow . | |
| 2,234,065 | 3/1941 | Vogt | 229/55 |
| 2,520,343 | 8/1950 | Saum | 383/120 |
| 2,701,878 | 2/1955 | Davis | 2/21 |
| 2,815,883 | 12/1957 | Robins et al. | 220/66 |
| 3,276,670 | 10/1966 | Harvey | 229/53 |
| 3,358,903 | 12/1967 | De Stefano et al. | 229/53 |
| 3,591,201 | 7/1971 | Brawn | 280/730 R |
| 3,810,654 | 5/1974 | DeBano, Jr. et al. | 280/728 R |
| 4,491,217 | 1/1985 | Weder et al. | 206/45.33 |
| 4,630,312 | 12/1986 | Milstein | 383/120 |
| 4,944,529 | 7/1990 | Backhaus | 280/743 R |
| 5,087,071 | 2/1992 | Wallner et al. | 280/743 R |
| 5,090,729 | 2/1992 | Watanabe | 280/743 R |
| 5,312,132 | 5/1994 | Pillet | 280/743 R |

FOREIGN PATENT DOCUMENTS

| | | | |
|---|---|---|---|
| 2439222 | 8/1974 | Germany . | |
| 4303932 | 8/1993 | Germany | 280/743 R |
| 0082646 | 4/1991 | Japan | 280/743 R |
| 3112745 | 5/1991 | Japan | 280/743 R |
| 4278859 | 10/1992 | Japan | 280/728 R |
| 5-77342 | 3/1993 | Japan . | |
| 9111345 | 8/1991 | WIPO | 280/743 R |

Primary Examiner—Kenneth R. Rice
Assistant Examiner—Peter C. English
Attorney, Agent, or Firm—Terry T. Moyer; James M. Robertson

[57] ABSTRACT

An inflatable cushion restraint is provided. The inflatable cushion restraint comprises a body portion, a web portion, and entrance for admitting an inflating medium. The body portion and the web portion are preferably joined about their perimeters by a single seam following the introduction of pleats from the perimeter of the body portion to locations in the interior thereof so as to provide material for billowing expansion during inflation. A process for forming the inflatable cushion restraint is also provided.

15 Claims, 5 Drawing Sheets

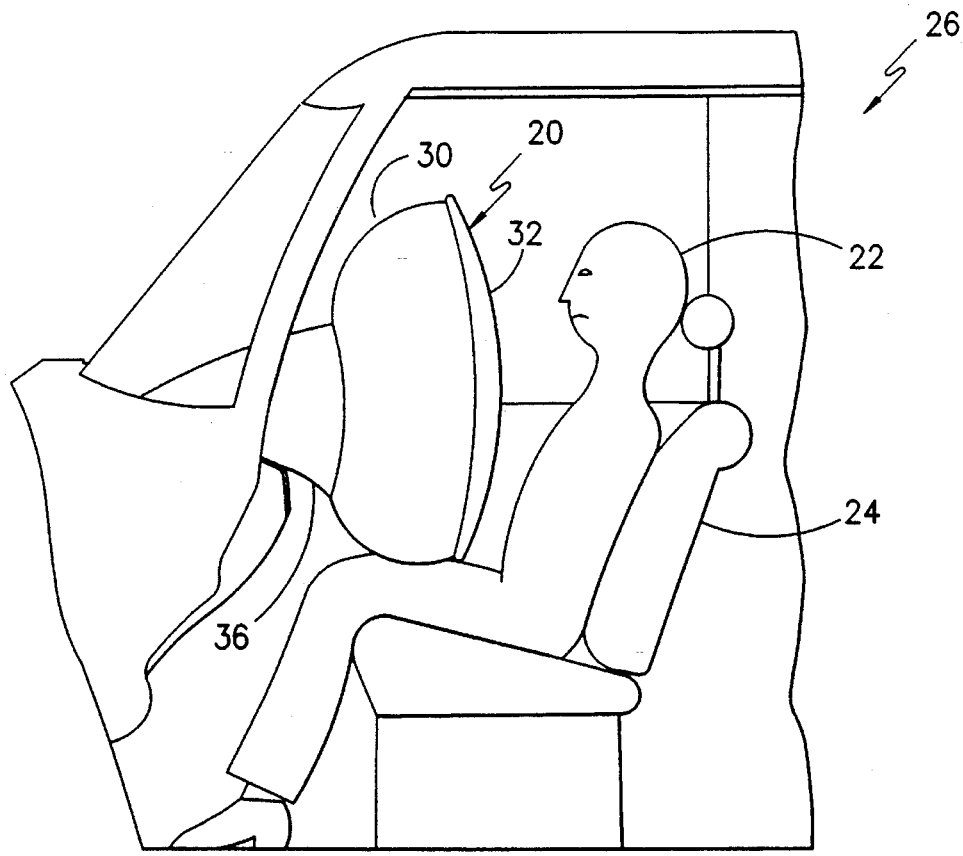
FIG. -1-
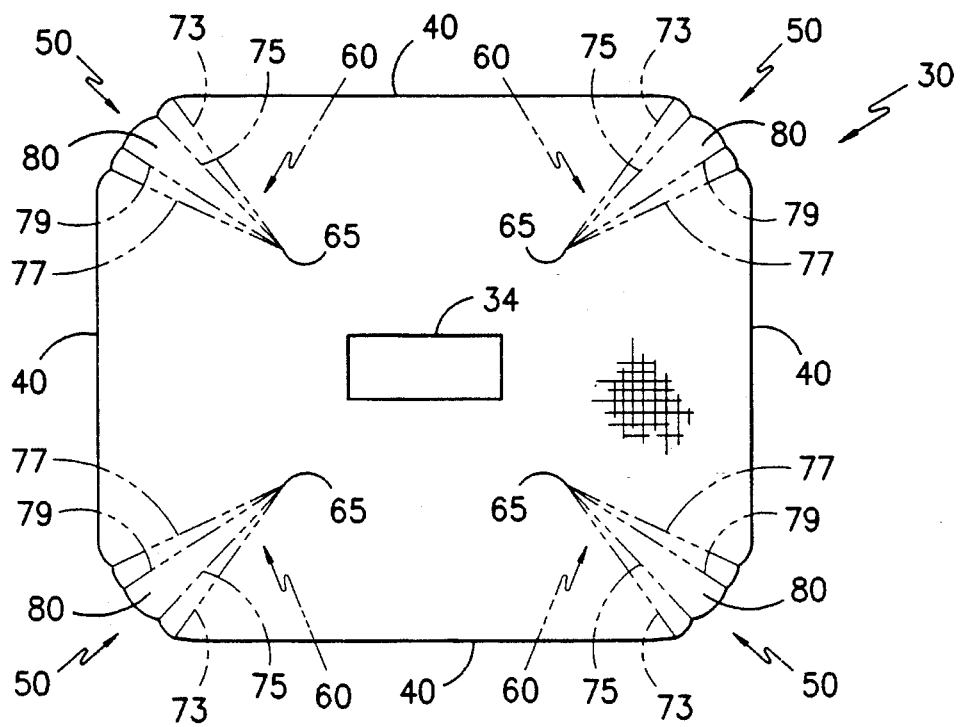
FIG. -2-

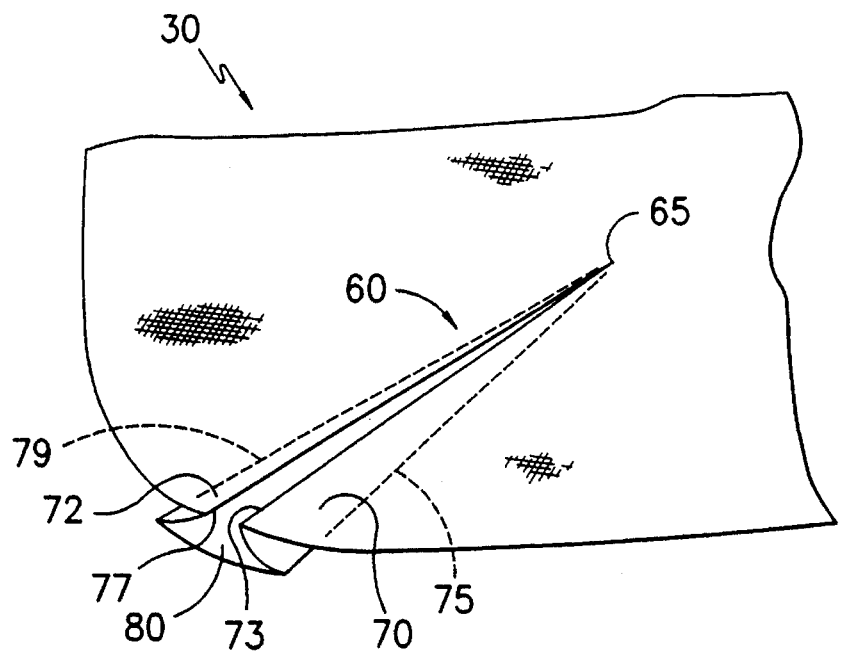
FIG. -3-
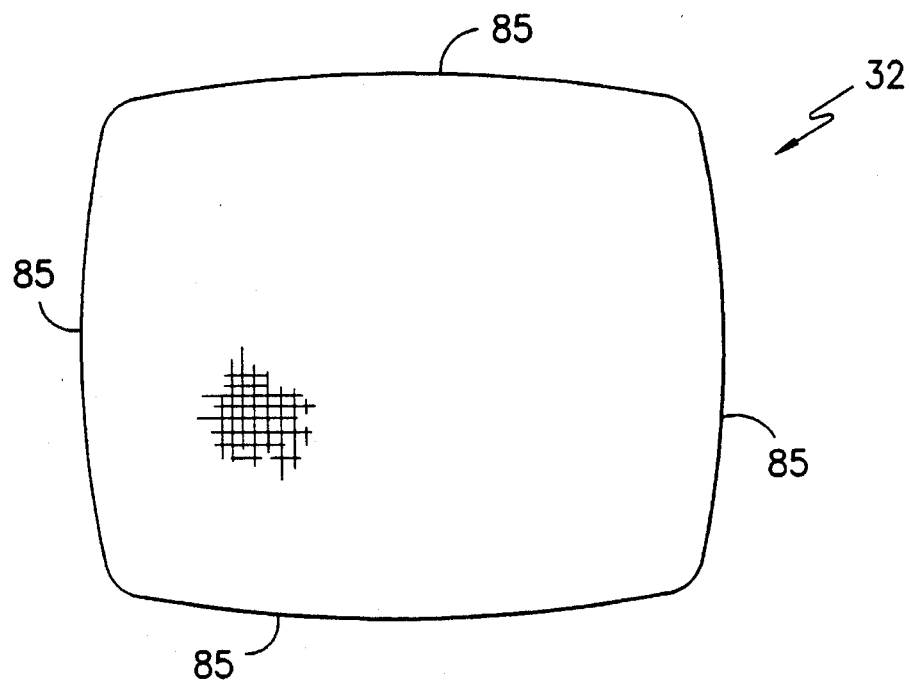
FIG. -4-

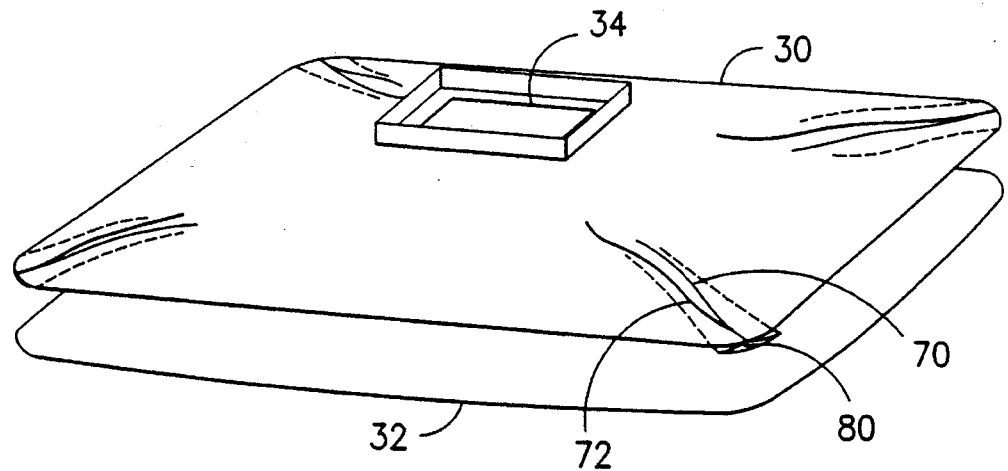
FIG. -5-
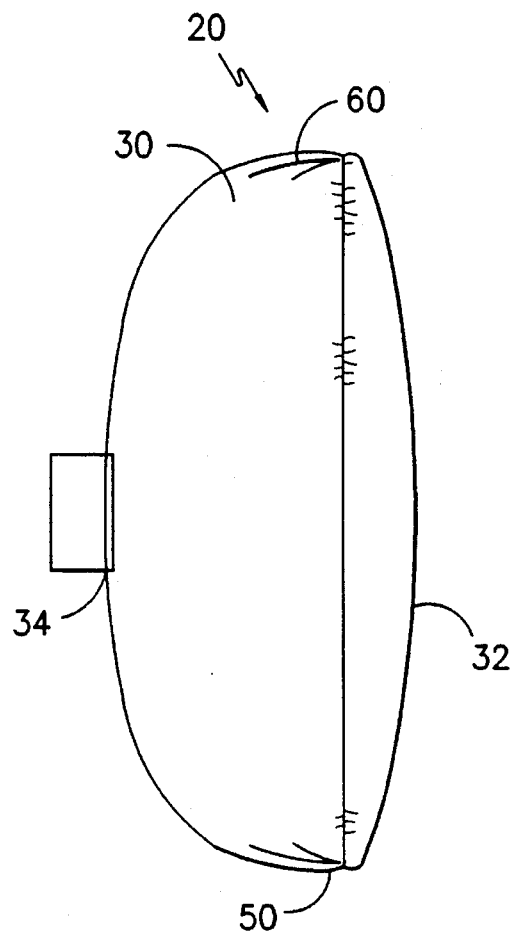
FIG. -6-
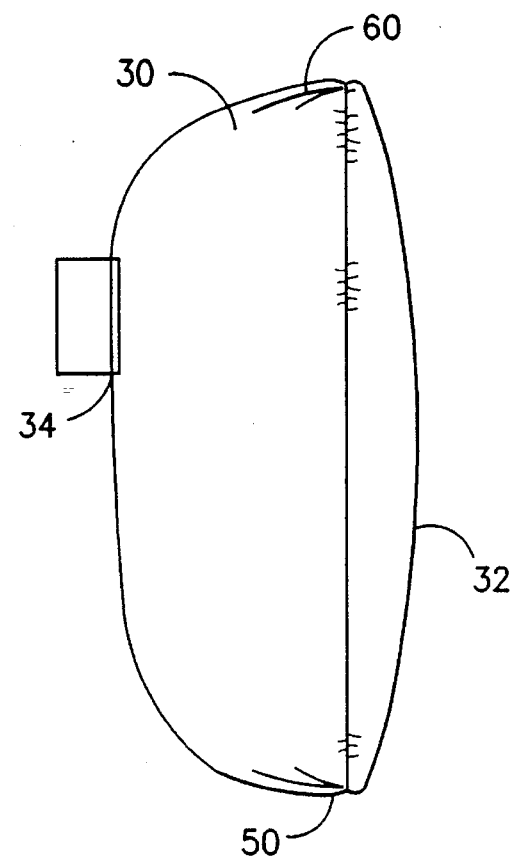
FIG. -7-

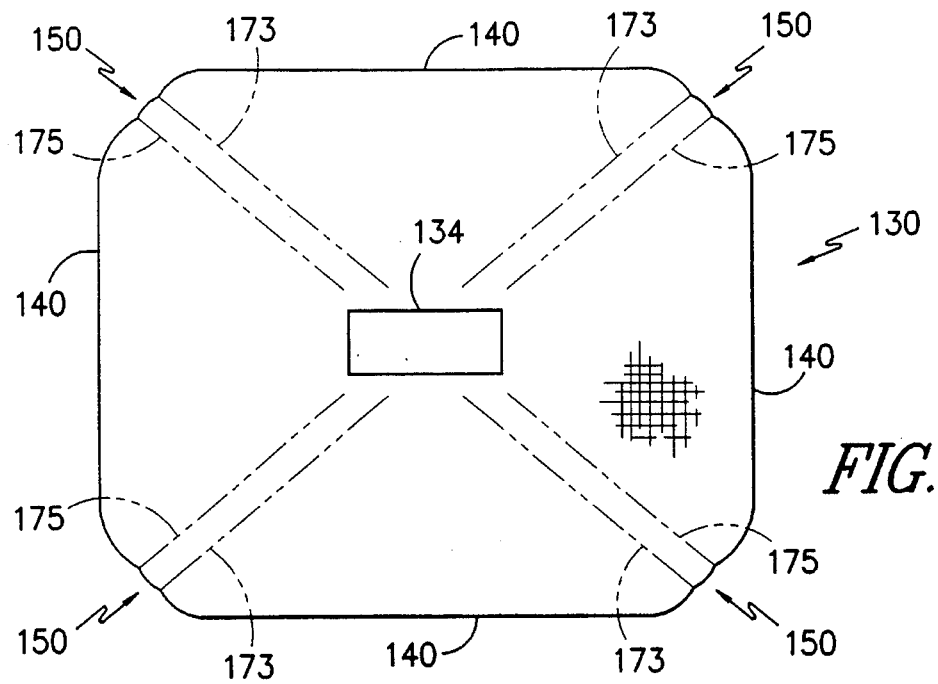
FIG. -8-
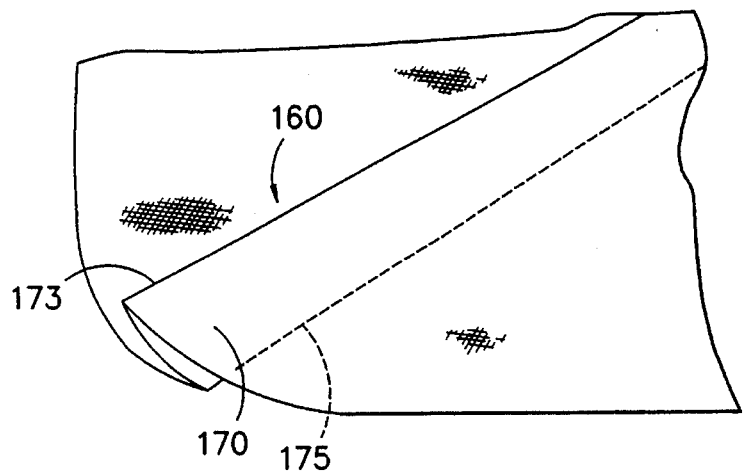
FIG. -9-
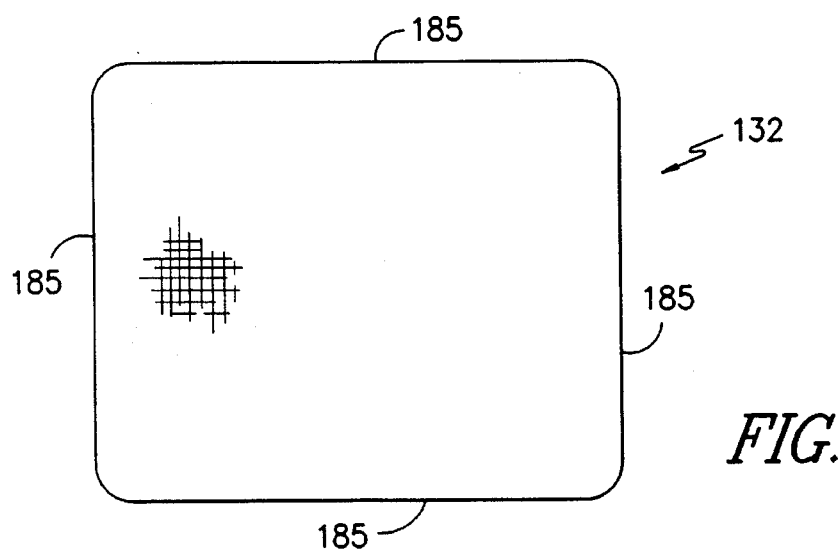
FIG. -10-

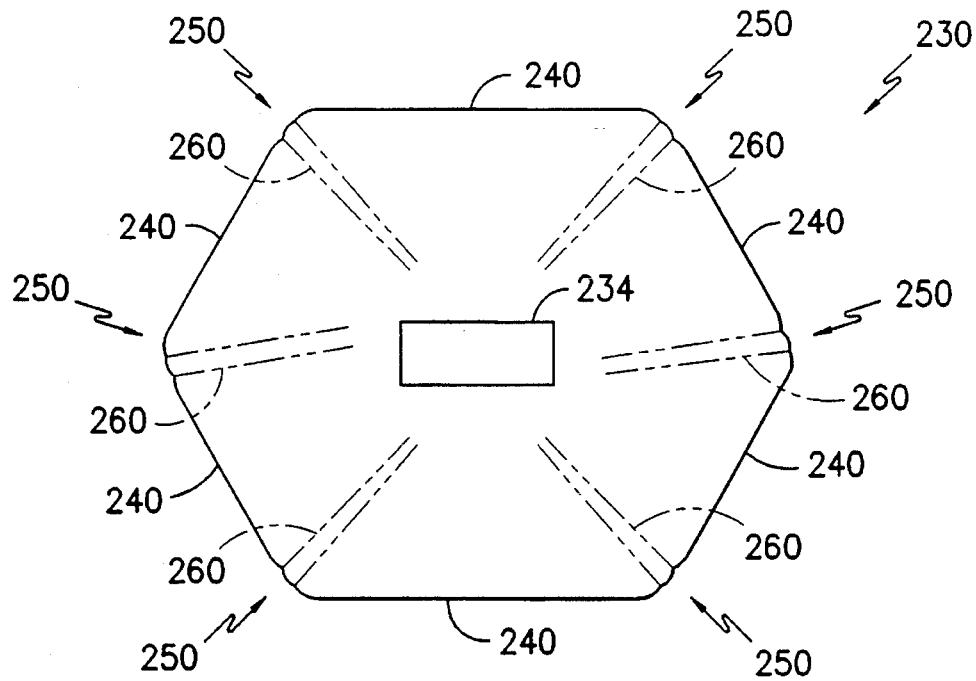
FIG. -11-
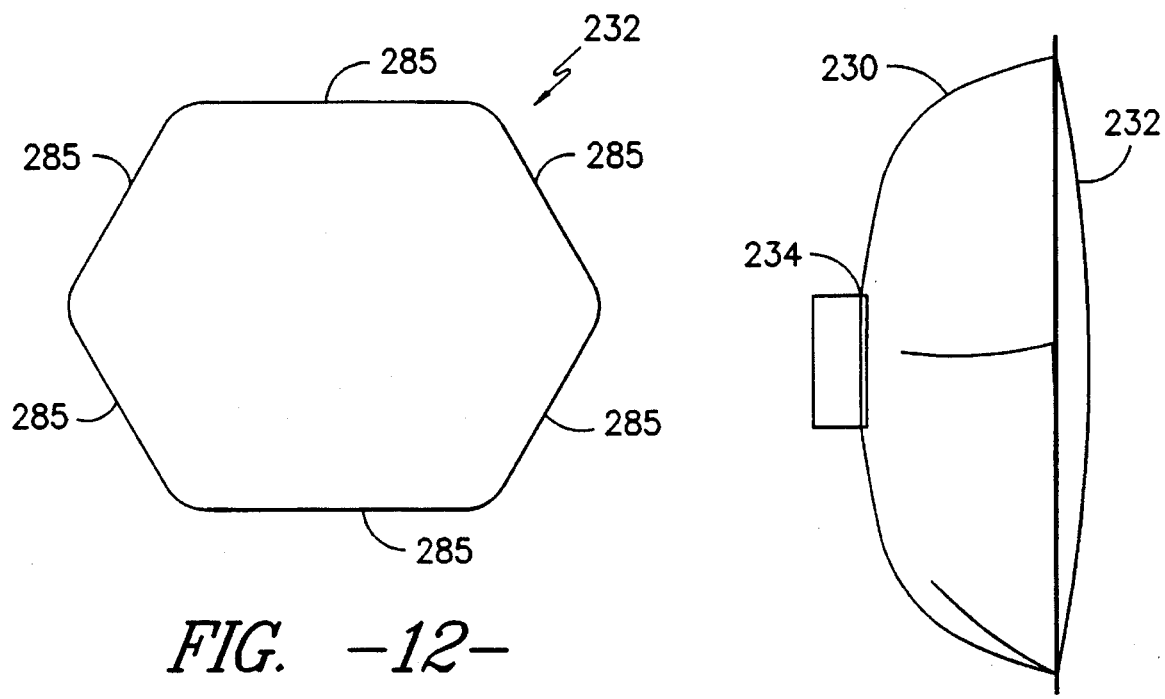
FIG. -12-
FIG. -13-

PLEATED INFLATABLE CUSHION FOR PASSENGER RESTRAINT

FIELD OF THE INVENTION

The present invention relates generally to inflatable cushions for vehicle occupant restraint and more particularly to a simplified two-piece pleated configuration for an inflatable cushion restraint for use in opposing relation to a vehicle passenger. The inflatable cushion restraint comprises a body portion, a web portion and gas inlet means for introducing an inflating medium. The body portion includes a plurality of folded pleats extending inwardly to the interior from the corners so as to permit the body to billow in an expanding manner when an inflating medium is introduced. The web portion may also be provided with pleats or folds to permit additional expansion.

BACKGROUND

An inflatable cushion restraint disposed within a supporting structure such as a dash panel or other fixed portion of an automobile body in opposing relation to a seat in the vehicle plays an important role in protecting the passengers in the vehicle from injury due to collision against the automobile body. Typically, the inflatable cushion is inflated rapidly by the pressure of a reaction gas released from an inflator during a collision. This gas generation takes place when a gas generating agent in the inflator induces a chemical reaction by a collision signal from a collision detecting sensor when the deceleration of the vehicle exceeds a predetermined set level. The gas which is generated by the generator is thereafter conveyed to the inflatable cushion which extends outwardly as it fills with gas to create a protective barrier between the vehicle occupant and the dash panel or other portion of the vehicle against which the occupant might otherwise be thrown.

As will be appreciated, it is important to provide efficient and effective ways to mass produce suitable inflatable cushions. Heretofore, inflatable cushions which are commonly referred to as air bags have typically been formed from numerous pieces of fabric cut into different shapes and fastened together by sewing to form the desired configuration. An opening formed in one of the pieces of fabric functions as a gas inlet opening for the cushion. Additional fabric may also be attached to the cushion in the proximity of the gas inlet opening to provide transmission means for the inflating medium. One such inflatable cushion is disclosed in U.S. Pat. No. 5,090,729 to Watanabe, the teachings of which are incorporated herein by reference.

It is to be understood that pre-cutting a number of odd shaped pieces and thereafter sewing together these pieces to form a desired structure may require a rather complex operation and can give rise to a significant amount of wasted fabric. In the patent literature there has been some recognition that simplified structures may be advantageous in both minimizing operational steps as well as in maximizing available materials.

U.S. Pat. No. 4,944,529 to Backhaus (incorporated by reference) discloses an inflatable cushion having a substantially quadrilateral configuration which is formed from no more than two flat blanks cut from web material.

U.S. Pat. No. 5,087,071 to Wallner (incorporated by reference) discloses an inflatable cushion formed from a length of fabric folded at predetermined locations to form a central portion and two end portions. The partially overlapping end portions and aligned edges of the central and end portions are joined together to form an inflatable bag adapted to form a predetermined configuration when inflated with gas.

German Patent 24 39 222 published Feb. 26, 1976 illustrates a cushion made from one piece of material cut in a special way with a pattern of V-shaped slots brought together at sealing seams to form the cushion. The shape of the pattern and the setting of the material is chosen so that no seam is at a 45° angle to the warp or to the weft of the material.

Japanese Published Application 5-77342 published Mar. 30, 1993 illustrates an inflatable cushion formed by folding a completely square piece of material such that the four corners are folded back to a depth longer than half of one side of the square after which the resulting overlapping portions are bonded together.

As will be appreciated, prior designs tend to either result in relatively poor material utilization by incorporating complex initial geometries, or require fairly complex sewing operations to form an enclosed cushion. The present invention provides for the use of relatively simple starting geometries for the fabric components in combination with easily mechanized folding operations and a single perimeter joining operation to form an enclosed cushion having sufficient depth to provide a degree of protection to a vehicle occupant while nonetheless permitting the cushion to remain flat during assembly. Accordingly, the present invention represents a useful advancement over the present art.

SUMMARY OF THE INVENTION

In view of the foregoing, it is a general object of the present invention to provide a simple inflatable cushion restraint for use in restraining a vehicle occupant in the event of a collision and a related process for manufacturing such inflatable cushion.

In that respect, it is an object of the present invention to provide a vehicle occupant restraint cushion which can be formed from a maximum of two fabric sections exclusive of any additional attachments, shape forming members or reinforcements.

It is a related object of the present invention to provide an inflatable occupant restraint cushion wherein the two fabric sections are joined by only a perimeter seam.

Accordingly, it is a feature of the present invention to provide an inflatable occupant restraint cushion formed from two simple geometry fabric sections wherein the first fabric section includes a plurality of pleats extending from the perimeter thereof towards the interior. The first fabric section can be attached about the perimeter to a second non-folded fabric section which forms a web.

It is a subsidiary feature of the present invention to provide an inflatable occupant restraint cushion formed from two simple fabric geometry sections wherein both fabric sections include a plurality of folded pleats.

It is a further subsidiary feature of the present invention to provide an inflatable occupant restraint cushion which comprises a body portion formed from a simple geometry fabric section comprising double flapped pleats extending from the corners thereof towards the interior and which can be connected about the perimeter to a non-folded web fabric section of similar geometry.

In accordance with one aspect of the present invention an inflatable cushion for restraining a vehicle occupant in the event of a collision is provided. The inflatable cushion comprises a pleated body portion formed from a first fabric section, a web portion formed by a second fabric section, and gas inlet means for introducing an inflating medium between the first and second fabric sections to inflate the cushion. The first and second fabric sections each include an interior and a perimeter, wherein the perimeter comprises a plurality of boundary edge portions with corner portions disposed therebetween. The first fabric section includes a plurality of pleats extending inwardly to the interior from the corner portions. Each of the pleats comprise at least one flap overlying a non-folded section of a corner portion. The web portion formed by the second fabric section is adjoined to the first fabric section along the perimeter of the first fabric section to form an enclosed inflatable cushion restraint which can be inflated to expand to a three dimensional configuration when an inflating medium is introduced between the first and second fabric sections.

In accordance with another aspect of the present invention, a method for forming the inflatable cushion of the present invention is provided. This method comprises the steps of: (a) cutting a first fabric section including a plurality of boundary edges separated by corner portions; (b) introducing a plurality of pleats in the first fabric section by either manual or automated means to form a folded body having pleats which extend from one or more of the corner portions inwardly to the interior of the first fabric section; (c) cutting a second fabric section matching the perimeter of the folded body; (d) abutting the folded body and the second fabric section to one another to form a layered structure; and (e) adjoining the folded body to the second fabric section by a perimeter seam.

BRIEF DESCRIPTION OF THE DRAWINGS

FIG. 1 shows a fully deployed inflatable cushion restraint of the present invention deployed in opposing relation to a vehicle occupant from the vehicle dash panel.

FIG. 2 shows a plan view of the body portion of the preferred embodiment of the inflatable restraint of the present invention prior to assembly.

FIG. 3 shows a corner of the body portion of the preferred embodiment of the present invention as shown in FIG. 2 subsequent to the introduction of a preferred corner pleating arrangement.

FIG. 4 shows the web portion of the preferred embodiment of the inflatable restraint of the present invention corresponding to the body portion shown in FIG. 2.

FIG. 5 shows a step in the assembly of the preferred embodiment of the present invention wherein the body portion illustrated in FIG. 2, including corner pleats as illustrated in FIG. 3, is brought into contacting relation with the web portion of FIG. 4 prior to the introduction of a perimeter seam.

FIG. 6 shows the preferred embodiment of the finished inflatable cushion restraint of the present invention.

FIG. 7 shows an alternative embodiment of the inflatable cushion restraint of the present invention wherein the entrance is off center.

FIG. 8 shows a plan view of an alternative embodiment of the body portion of the inflatable restraint of the present invention prior to assembly.

FIG. 9 shows a corner of the body portion of the inflatable restraint as illustrated in FIG. 8 subsequent to the introduction of an alternative pleating arrangement.

FIG. 10 shows a plan view of an alternative embodiment of the web portion of the inflatable cushion restraint of the present invention corresponding to the body portion illustrated in FIG. 8.

FIG. 11 shows a plan view of an alternative embodiment of the body portion of the inflatable restraint of the present invention prior to assembly.

FIG. 12 shows an alternative embodiment of the web portion of the present invention corresponding to the body portion illustrated in FIG. 11.

FIG. 13 shows a profile of a completed inflatable cushion restraint formed from the body portion illustrated in FIG. 11 and the web portion illustrated in FIG. 12.

While the invention is illustrated and will be described in connection with a preferred embodiment, it will be understood that it is in no way intended to limit the invention to that embodiment. On the contrary, it is intended to cover all alternatives, modifications and equivalents as may be included within the true spirit and scope of the invention as limited only by the appended claims.

DESCRIPTION

Turning now to the drawings, in FIG. 1 there is shown a fully deployed inflatable cushion restraint 20 in opposing relation to a passenger 22 located on the front seat 24 of a vehicle 26 such as an automobile or the like. It is to be understood that while the passenger 22 is shown to be located in the front seat 24 of the vehicle 26, the passenger 22 could likewise be located in a rear seat (not shown) of the vehicle 26 in which event the inflatable cushion restraint 20 could be housed in, and deployed from, the rear of the front seat 24.

In the illustrated and preferred embodiment, the inflatable cushion restraint 20 comprises a body portion 30 and web portion 32 as described more fully below. The inflatable cushion restraint 20 also preferably includes an entrance within either the body portion 30 or the web portion 32 for introduction of a gas or other inflating medium. In the illustrated and preferred embodiment, the entrance comprises an opening 34 (FIG. 2) in the body portion 30 of the inflatable cushion restraint 20. The opening 34 may be connected to an extended neck 36 for use in transporting the inflating medium from an inflator to the inflatable cushion restraint 20.

The body portion 30 of the inflatable cushion restraint 20 is preferably formed from a first section of fabric having a generally quadrilateral rectangular configuration (FIG. 2). As will be appreciated, use of geometries such as rectangles and the like permits an article to be manufactured with a minimum of fabric waste. As illustrated, the perimeter of the first section of fabric from which the body portion 30 is formed, preferably comprises four substantially straight boundary edge portions 40 which are separated by four corner portions 50. A scalloped configuration as illustrated may be preferred for the corner portions 50 to facilitate the introduction of corner pleats as described below, although alternative corner configurations may likewise be utilized.

In order to expand the inflatable cushion restraint 20 in a billowing manner to a three dimensional configuration having sufficient depth to provide protection to the passenger 22 while still permitting the cushion to be substantially flat during assembly and storage, a portion of the fabric in the body portion 30 is formed into pleats 60 preferably extending diagonally to interior terminal points 65 from the corner portions 50 of the fabric section from which the body portion 30 is formed. The pleats 60 may be formed either by hand or in an automated process. A preferred configuration for the pleats 60 is illustrated in FIG. 3 wherein it is shown that the interior terminal points 65 preferably lie intermediate the corner portions 50 and the center of the section of fabric forming the body portion 30.

As illustrated, each of the pleats preferably comprise a first flap 70 and a second flap 72. The first flap 70 is formed by means of a first fold line 73 and a second fold line 75. The second flap 72 is formed by means of a third fold line 77 and a fourth fold line 79. When in the folded position illustrated in FIG. 3, the first flap 70 and the second flap 72 are preferably in opposing relation to one another and at least partially overlie a non-folded segment 80 of the corner portion 50. As shown in FIG. 2, prior to the folding operation, the first fold line 73 is disposed outwardly from the second fold line 75. That is, the first fold line 73 is further away from the non-folded segment 80 of the corner position than is the second fold line 75. In like manner, the third fold line 77 is disposed outwardly from the fourth fold line 79.

As will be appreciated, the width of the non-folded segment 80 in combination with the length and width of the first and second flaps 70, 72 extending to the interior terminal point 65 determines the amount of folded material available for billowing expansion during inflation and thus provides a means to vary the final configuration of the expanded cushion as may be desired. For example, it has been found that short and narrow flaps overlying a narrow non-folded segment 80 give rise to an inflated cushion having a broad surface and reduced depth, while long and broad folds overlying a wide non-folded segment 80 give rise to an inflated cushion having a much greater depth.

As previously indicated, the corner portions 50 preferably have a scalloped profile to facilitate the inward folding of the first and second flaps 70, 72 such that a smooth rounded profile is in place following the folding operation (FIG. 3). As will be appreciated, the corner portions 50 may likewise be of a generally angular configuration prior to the folding operation in which event any overhang may simply be trimmed away.

A preferred geometry for the web portion 32 of the inflatable cushion restraint 20 is illustrated in FIG. 4. As shown, the web portion 32 comprises a second section of fabric substantially rectangular in shape and having four slightly bowed boundary edge portions 85 and rounded corner sections forming a perimeter which can be attached by adhesive means about the perimeter of the folded body portion 30.

As will be appreciated by those of skill in the art, the size and shape of the web portion 32 is preferably matched to the size and shape of the folded body portion 30 to promote efficient attachment by either manual or automated means. Further, while the web portion 32 is illustrated as having a non-folded configuration it is to be understood that the web portion 32 may be provided with pleats as in the body portion 30 so as to provide additional depth in the expanded inflatable cushion restraint if desired.

The relation of the body portion 30 to the web portion 32 during assembly of the preferred embodiment is illustrated in FIG. 5. As shown, in the preferred method the folded body portion 30 is placed in abutting relation to the web portion 32 thereby forming a layered sandwich structure with the first and second flaps 70, 72 of each corner on the exterior surface not contacting the web portion 32. Once the body portion 30 and the web portion 32 are placed in proper relation, an adhesive seam is used to connect the perimeters of the body portion 30 and the web portion 32 thereby forming the inflatable cushion restraint 20 which is enclosed except for the entrance 34. While the seam may be a traditional stitched seam, the seam may likewise be formed from alternative means such as adhesives and the like. Preferably, the inflatable cushion restraint is thereafter turned inside out to provide smooth rounded corner sections when the inflatable cushion restraint 20 is inflated and the fabric within the pleats is utilized for expansion (FIG. 6).

It is to be appreciated that while the pleats 60 have been illustrated in the preferred embodiment as extending towards an entrance 34 located in the center of the body portion 30, the pleats may extend towards alternative points other than the center to give rise to alternative geometries. By way of example only, a side profile of an inflatable cushion restraint is shown in FIG. 7, wherein the pleats converge to a point off center. Thus, it is to be appreciated that by varying the orientation of the pleats 60, the final shape of the expanded inflatable restraint 20 may be varied to achieve alternative final configurations as may be desired.

A fabric section for an alternative body portion 130 for use in forming the inflatable cushion restraint of the present invention is illustrated in FIG. 8. As shown, the fabric section for the alternative body portion 130 comprises an interior having an entrance 134 and a perimeter comprising four substantially straight boundary portions 140 separated by four corner portions 150. As illustrated, the corner portions 150 are of a scalloped configuration such as to permit the introduction of a single flap pleat 160, as shown in FIG. 9.

The single flap pleat illustrated in FIG. 9 comprises a flap 170, formed by a first fold line 173 overlapping a second fold line 175. As shown, the introduction of the pleat 160 at each of the corner portions 150 provides a rounded corner for perimeter attachment as well as enclosed material for use in expansion during inflation while sill permitting the cushion to be substantially flat and compact.

An alternative embodiment web portion 132 for use in conjunction with the body portion 130 is illustrated in FIG. 10. The web portion 132 of the alternative embodiment is substantially rectangular, comprising four substantially straight boundary edges 185 surrounding an interior portion. In the alternative embodiment, the folded body portion 130 and the web portion 132 are joined in substantially the same manner as that described above in relation to the preferred embodiment. That is, the folded body portion 130 and the web portion 132 are brought into abutting relation to form a layered sandwich structure having the flaps 170 of the pleats 160 disposed on the outer surface. The folded body portion and the web portion are then joined by stitching or other adhesive means around the perimeter of the sandwich structure to form an inflatable cushion restraint. The inflatable cushion restraint is thereafter preferably turned inside out to provide smooth rounded corners during inflation.

By way of example only and not limitation, FIG. 11 illustrates one non-quadrilateral geometry from which a pleated body portion 230 may be formed. As shown, the body portion 230 is of a generally hexagonal shape comprising a plurality of boundary edges 240 separated from each other by scalloped corner portions 250. Pleats 260 such as those illustrated in FIGS. 9 or 3 which are shown as hidden lines may be introduced at the corner portions 250 to permit billowing expansion during inflation while still permitting the fabric section from which the body portion is formed to remain substantially flat during construction and storage prior to use.

A web portion 232 including boundary edges 285 corresponding to the geometry of the body portion 230 is shown in FIG. 12. The folded body portion 230 and corresponding web portion 232 may be joined in the manner as described above in relation to other embodiments to form an inflatable cushion restraint as shown in FIG. 13. It is to be appreciated that while FIG. 11 illustrates one possible polygonal geometry for use in forming the inflatable cushion restraint of the present invention, alternative polygonal geometries such as occur to those of skill in the art may likewise be utilized. Moreover, it is to be appreciated that both the body portion and the web portion of any geometry may be pleated to permit additional expansion if desired.

The present invention thus provides an inflatable cushion restraint which may be formed from simple geometry fabric sections by a small number of relatively simple construction steps thus permitting high fabric utilization and reduced construction cost. The inflatable cushion restraint may be inflated from a relatively flat storage condition to a three dimensional condition for protection of a vehicle passenger during a collision. A method for forming the inflatable cushion restraint is also provided.

What is claimed is:

1. An inflatable cushion restraint for restraining a vehicle occupant in the event of a collision, the inflatable cushion restraint comprising:

a body portion having an interior and a perimeter, said perimeter of said body portion including a plurality of pleated corner portions wherein said pleated corner portions include expansible folded pleats extending from said perimeter of said body portion to the interior of said body portion, said pleated corner portions being separated from one another by substantially straight non heat shrunk boundary edge portions;

a web portion including an interior and a perimeter, said perimeter of said web portion being joined to said perimeter of said body portion to form an enclosure by seam means formed along the perimeter of the web portion and the substantially straight boundary edge portions of said body portion such that the perimeter of said web portion and the substantially straight boundary edge portions of said body portion are in substantially flat overlaying relationship; and entrance means for introducing an inflating medium between said web portion and said body portion such that said inflatable cushion may be expanded to an operable state by the unfolding of said expansible folded pleats.

2. The invention of claim 1, wherein said body portion is formed from a single piece of fabric.

3. The invention of claim 1, wherein said body portion is quadrilateral and said expansible folded pleats extend diagonally from said corner portions of said perimeter to points in the interior of said body portion.

4. The invention of claim 1, wherein said pleated corner portions have a scalloped configuration.

5. The invention of claim 1, wherein at least a portion of said expansible folded pleats comprise two flaps.

6. The invention of claim 1, wherein said expansible folded pleats extend from said pleated corner portions points offset from to the center of said body portion.

7. The invention of claim 1, wherein said web portion is of a pleated configuration.

8. The invention of claim 1, wherein said entrance means comprise an opening disposed substantially in the center of said body portion.

9. The invention of claim 1, wherein said seam means are stitched seams.

10. An inflatable cushion restraint for restraining a vehicle occupant in the event of a collision, the inflatable cushion restraint comprising:

a pleated body portion formed from a first fabric section, a web portion formed from a second fabric section and gas inlet means for introducing an inflating medium into the inflatable cushion restraint, said first and second fabric sections being quadrilateral in configuration, said first and second fabric sections each including an interior and a perimeter, wherein said perimeter of each of said first and second fabric sections comprise a plurality of non heat shrunk boundary edge portions separated by corner portions, said first fabric section further including a plurality of expansible folded pleats extending inwardly to the interior of said first fabric section form at least a portion of said corner portions, said second fabric section being adjoined to said first fabric section along the perimeter of said first fabric section to enclose the inflatable cushion restraint by means of a stitched seam such that the perimeters of said first and second fabric sections are joined in substantially flat overlying relation without the occurrence of puckering along boundary edge portions intermediate said corner portions, such that the inflatable cushion restraint will expand to a three-dimensional configuration when said inflating medium is introduced through said gas inlet means.

11. The invention of claim 10, wherein at least a portion of said plurality of pleats are of a double flap configuration comprising a first flap and a second flap, wherein said first flap and said second flap are disposed in opposing relation and overlie non-folded sections of said corner portions of said first fabric section.

12. A process for forming in inflatable cushion restraint from two fabric sections, the process comprising the steps of:

(a) cutting a first fabric section comprising an interior and a plurality of substantially straight non heat shrunk boundary edges, said plurality of boundary edges being separated by corner portions:

(b) introducing a plurality of pleats into said first fabric section to form a folded body, said plurality of pleats comprising at least one flap extending form one or more of said corner portions of said first fabric section to said interior of said first fabric section;

(c) cutting a second fabric section having a perimeter matching the perimeter of said folded body;

(d) abutting said folded body and said second fabric section to one another to form a layered structure; and (e) adjoining said folded body to said second fabric section by a stitched perimeter seam to form an enclosure such that the perimeter of said first and second fabric sections are joined in substantially flat overlying relation without the occurrence of puckering along the boundary edges intermediate said corner portions.

13. The process of claim 12, wherein the step (d) said plurality of pleats are on the exterior of said layered structure.

14. The process of claim 12, comprising the further step of turning the enclosure inside out.

15. The process of claim 12, wherein in step (b) each of said pleats introduced comprises two flaps.

* * * * *

UNITED STATES PATENT AND TRADEMARK OFFICE
CERTIFICATE OF CORRECTION

PATENT NO.  : 5,482,318

DATED       : January 9, 1996

INVENTOR(S) : John Alexander Sollars, Jr.

It is certified that error appears in the above-identified patent and that said Letters Patent is hereby corrected as shown below:

Column 7, line 55 - add the word "to" after the word "portions".

Signed and Sealed this

Twenty-third Day of June, 1998

Attest:

BRUCE LEHMAN

*Attesting Officer*          *Commissioner of Patents and Trademarks*